United States Patent
Adams et al.

(10) Patent No.: US 6,483,621 B1
(45) Date of Patent: Nov. 19, 2002

(54) METHOD AND APPARATUS FOR TONE TRACKING IN WIRELESS OPTICAL COMMUNICATION SYSTEMS

(75) Inventors: Jeffrey C. Adams, Seattle, WA (US); Mark Pratt, Seattle, WA (US); Micah J. Barclay, Redmond, WA (US)

(73) Assignee: Terabeam Corporation, Kirkland, WA (US)

( * ) Notice: Subject to any disclaimer, the term of this patent is extended or adjusted under 35 U.S.C. 154(b) by 0 days.

(21) Appl. No.: 09/627,819

(22) Filed: Jul. 28, 2000

(51) Int. Cl.[7] ............................................. H04B 10/00
(52) U.S. Cl. ..................... 359/159; 359/181; 359/189; 359/193
(58) Field of Search ................... 359/159, 180, 359/181, 182, 183, 189, 110, 193

(56) References Cited

U.S. PATENT DOCUMENTS

| | | | |
|---|---|---|---|
| 4,633,315 A | * 12/1986 | Kasperkovitz | 348/726 |
| 4,918,396 A | * 4/1990 | Halemane et al. | 359/333 |
| 5,062,150 A | 10/1991 | Swanson et al. | |
| 5,539,557 A | * 7/1996 | Horiuchi et al. | 359/110 |
| 5,594,580 A | * 1/1997 | Sakanaka et al. | 359/172 |
| 5,710,652 A | 1/1998 | Bloom et al. | |
| 5,777,768 A | 7/1998 | Korevaar | |
| 5,790,291 A | 8/1998 | Britz | |
| 5,841,563 A | * 11/1998 | Effenberger | 359/158 |
| 6,025,948 A | * 2/2000 | Gautheron | 359/177 |
| 6,084,694 A | * 7/2000 | Milton et al. | 359/124 |
| 6,091,528 A | 7/2000 | Kanda | |
| 6,097,522 A | 8/2000 | Maerki et al. | |
| 6,178,024 B1 | * 1/2001 | Degura | 359/159 |
| 6,219,133 B1 | 4/2001 | Kawase et al. | |
| 6,271,953 B1 | * 8/2001 | Dishman et al. | 359/172 |

OTHER PUBLICATIONS

Lambert and Casey, "Laser Communications in Space," Artech House, Inc.: 1995, pp. 174–176.

\* cited by examiner

*Primary Examiner*—Jason Chan
*Assistant Examiner*—Christina Y Leung
(74) *Attorney, Agent, or Firm*—Blakely Sokoloff Taylor & Zafman LLP

(57) ABSTRACT

A transmitted light signal, such as laser light, is modulated by a data signal and by a tracking signal. The tracking signal has a modulation depth that is substantially smaller than a peak-to-peak amplitude of the light signal. At reception, the tracking signal is recovered from the modulated light signal and is used to determine an orientation of a receiver with respect to the transmitted light signal.

34 Claims, 4 Drawing Sheets

METHOD AND APPARATUS FOR TONE TRACKING IN WIRELESS OPTICAL COMMUNICATION SYSTEMS

BACKGROUND OF THE INVENTION

1. Field of the Invention

The present invention relates generally to communication systems, and in particular, relates to tone tracking in wireless optical communication systems.

2. Background Information

With the increasing popularity of wide area networks, such as the Internet and/or World Wide Web, network growth and traffic have exploded in recent years. Network users continue to demand faster networks, and as network demands continue to increase, existing network infrastructures and technologies are reaching their limits.

An alternative to existing hardwire or fiber network solutions is the use of wireless optical telecommunications technology. Wireless optical telecommunications utilize beams of light, such as lasers, as optical communications signals, and therefore do not require the routing of cables or fibers between locations. Data or information is encoded into a beam of light, and then transmitted through free space from a transmitter to a receiver.

For point-to-point free space laser communications, the use of narrow optical beams provides several advantages, including data security, high customer density, and high directivity. High directivity makes the achievement of high data rates and high link availability easier, due to higher signal levels at a receiver. In order to take full advantage of this directivity, some form of tracking is often necessary to keep the antennas of a transmitter and of the receiver properly pointed at each other. For example, a transmitted optical beam with a 1-mrad divergence has a spot diameter at the receiver of about 1 meter at 1 km range. Thus, movement of the transmitter or receiver by even a small fraction of the divergence (or field-of-view) could compromise the link unless active tracking is employed. Since high-speed communication channels utilize extremely sensitive detectors, such systems require equally sensitive tracking systems.

Charge coupled device (CCD) arrays or quadrant cell optical detectors (sometimes referred to as "quad cells") may be used as tracking detectors in a tracking system. In either case, an electrically controllable steering mirror, gimbal, or other steering device may be used to maximize an optical signal (e.g., light) directed at a high speed communication detector, based on information provided by the tracking detector. This is possible since optical paths for tracking and communication are pre-aligned, and the nature of a tracking signal for a perfectly aligned system is known. CCD tracking is very sensitive, offers potentially more immunity to solar glint because of the ability to ignore glint "features" on the CCD array, and is in general a well-proven tracking method. However, at certain wavelengths, a separate lower wavelength tracking signal is often necessary due to limitations of CCD detection systems.

For an aligned optical system, an equal signal in all four quadrants of quad cells will normally indicate that the steering mirror has optimally directed the optical communication signal onto the high-speed communication detector—if there is any deviation from this, the steering mirror will direct the optical signal back to this optimum equilibrium.

The signal on the quad cells may be a direct current (DC) signal. DC tracking may use the average signal content of the tracking signal from each quad cell. A problem with DC is that quad cell electronics cannot distinguish between an actual optical signal and a signal that may have come from solar background radiation or from imperfect transmit/receive isolation. Thus, the tracking system may misalign the transmitter and receiver in the presence of background light. Collectively, existing tracking systems have the disadvantages of being complex, bulky, expensive, and sometimes unreliable.

Accordingly, improvements are needed for tracking in wireless optical communication systems.

SUMMARY OF THE INVENTION

According to an aspect of the invention, a method includes modulating a light signal with a data signal and with a tracking signal having a modulation depth substantially smaller than a peak-to-peak amplitude of the light signal. The light signal modulated by the data signal and by the tracking signal is transmitted and received. The method further includes recovering the tracking signal from the received modulated light signal and using the tracking signal to determine an orientation of a receiver with respect to the received modulated light signal.

BRIEF DESCRIPTION OF THE DRAWINGS

Non-limiting and non-exhaustive embodiments of the present invention will be described in the following figures, wherein like reference numerals refer to like parts throughout the various views unless otherwise specified.

DETAILED DESCRIPTION OF THE ILLUSTRATED EMBODIMENTS

Embodiments of a system and method for tone tracking in a wireless optical communication system are described in detail herein. In the following description, numerous specific details are provided in order to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of various embodiments of the invention.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

The term "tracking" as used herein, is intended to have a meaning like that understood by those skilled in the art. That is, the term "tracking" more or less includes the monitoring processing, and adjustment of an orientation of an optical receiver (and/or an orientation of its component parts) with respect to a received optical signal. In this manner, tracking allows the optical receiver to remain substantially aligned with the received optical signal, thereby resulting in maximum reception performance at the optical receiver.

An embodiment of the invention uses tone tracking in order to obtain an alternating current (AC) tracking signal, so that the AC tracking signal can be subsequently used to adjust an orientation of an optical receiver with respect to a received optical data communication signal. The data communication signal can comprise laser light and the like, at 1548.51 nm, for example. The data communication signal is not limited to being monochromatic or to any particular wavelength or color, and may include visible light as well as ultraviolet or infrared (IR) portions of the spectrum. The data communication signal is partially modulated at a transmitter at some tone, such as at 100 kHz, for example. The modulation depth of this 100 kHz signal might be only 5% of the total peak-to-peak power of the data communications signal, or some other minimal value. This modulation depth is generally not increased too much—otherwise the sensitivity of the communication channel may be adversely affected or data may be lost and/or distorted.

Figure 1:
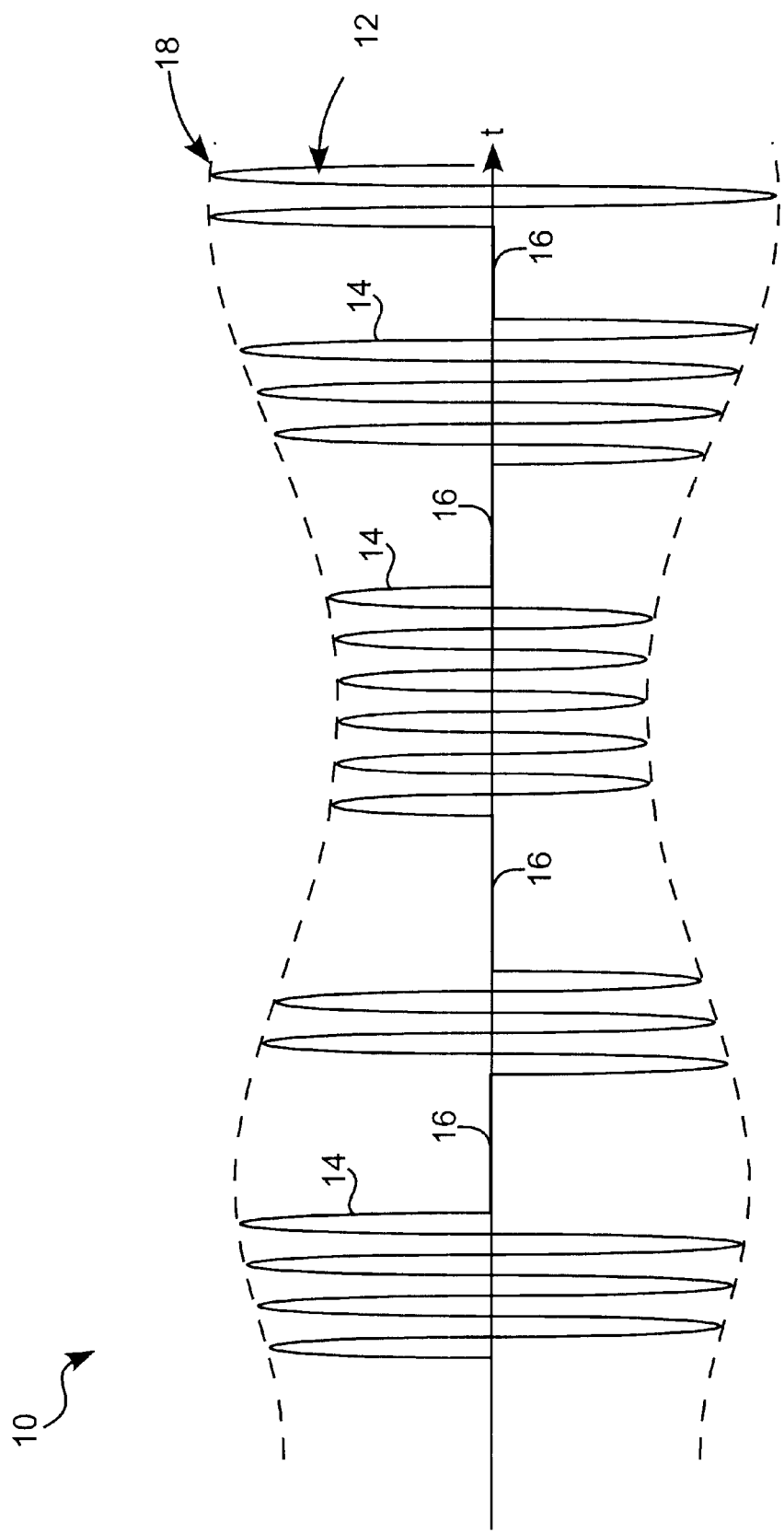
FIG. 1 is a signal diagram illustrating use of a tone signal for tracking according to an embodiment of the invention.

Referring first to FIG. 1, shown generally at 10 is a time-domain signal diagram illustrating an embodiment of the invention. An optical data communication signal 12 is shown having "ON" segments 14 and "OFF" segments 16, corresponding to time periods. The data communication signal 12 can represent, for example, a binary pulse train of is and Os, where the is correspond to the ON segments 14 and the Os correspond to the OFF segments 16. The data communication signal 12 can be produced, for example, by amplitude-modulating a high-frequency carrier wave with the binary pulse train. It is also possible to use amplitude shift keying, on/off keying (OOK) or other modulation methods, such as frequency modulation or phase modulation.

According to an embodiment of the invention, a low frequency tracking or tone signal 18 is injected directly into the data communication signal 12. That is, the tone signal 18 is used to further modulate the data communication signal 12, thereby resulting in the "envelope" shown in FIG. 1.

The depth of modulation by the tone signal 18 can vary. In an embodiment, the tone signal 18 modulates the data communication signal 12 at a 5%–10% depth. By doing this, the data communication signal 12 loses no more than 5%–10% of its peak signal. Although, a modulation depth of 5%–10% is provided by this embodiment, it is understood that higher or lower modulation depths may be used, depending on the particular application, on the sensitivity of the optical communication system to variations in peak amplitude, and/or on the permissible amount of data loss or data distortion. Furthermore, it is understood that the signal diagram 10 is only an illustrative representation, and is not necessarily drawn to scale in terms of amplitude, frequency, phase, etc.

The tone signal 18 may be at any suitable low frequency that is sufficiently distinguishable from the frequency of the data communication signal 12. The tone signal 18, in an embodiment, can have a frequency of 1 kHz–100 kHz, for example, while the data communication signal 12 can have a frequency in the MegaHertz or GigaHertz range, for example. Furthermore, although the tone signal 18 is described herein for simplicity of explanation as a sinusoidal signal, it is to be appreciated that other types of signals may be used, such as square waves, triangle waves, etc.

Figure 2:
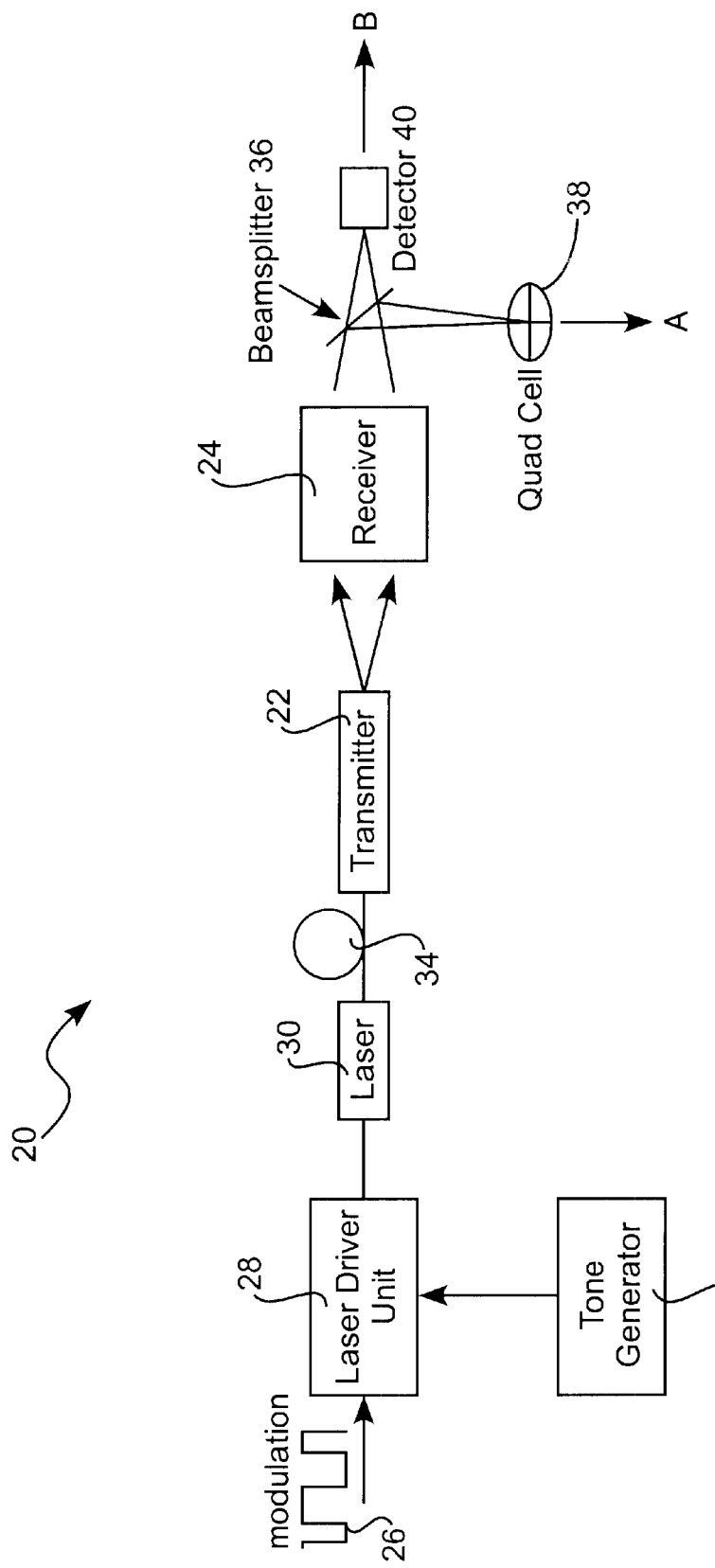
FIG. 2 is a functional block diagram of an embodiment of a wireless optical communication system that can use the tone signal of FIG. 1 for tracking.

Shown generally at 20 in FIG. 2 is an embodiment of a wireless optical system that can transmit/receive a signal represented by the signal diagram 10 of FIG. 1. The system 20 can include a separate transmitter 22 and a receiver 24 in one embodiment, while in another embodiment, the transmitter 22 and the receiver 24 can comprise a transceiver unit capable of communicating with other transceiver units, transmitters, receivers, or other system components.

Beginning at the transmitter end of the system 20, a binary pulse train 26, representing data to be transmitted, is provided to a laser driver unit 28. The laser driver unit 28 can comprise hardware, software, modulators, control units, processors, etc. to control input and output of a laser 30. The laser driver unit 28 uses the binary pulse train 26 to provide modulation for a high-frequency carrier wave, such that the laser 30 can output the data communication signal 12 of FIG. 1.

In order to provide the data communication signal 12 with the tone signal 18 for tracking, a tone generator 32 is coupled to the laser driver unit 28. The tone generator 32 can provide the tone signal 18 at 1 kHz, for example, such that the laser driver unit 28 can further modulate the data communication signal 12. The end result is that the laser 30 can output a signal represented by the signal diagram 10 of FIG. 1, where both the binary pulse train 26 and the tone signal 18 from the tone generator 32 modulate the high-frequency carrier wave.

The laser 30 outputs modulated laser light, represented by the signal diagram 10 of FIG. 1, to the transmitter 22 via a fiber link 34. The fiber link 34 can comprise a polarization maintaining fiber or other suitable commercially available fiber for laser applications. The transmitter 22 can include an erbium-doped fiber amplifier, or other suitable amplifier and related components that are capable of transmitting the modulated laser light through free space to the receiver 24.

At the receiver end of the system 20, the receiver 24 receives the modulated laser light transmitted from the transmitter 22, and directs the laser light to a beamsplitter 36. The beamsplitter 36 splits the laser light by sending a first portion to an optical detector 38, such as a quad cell detector in one embodiment, and a second portion to a communication detector 40. In one embodiment, the beamsplitter 36 sends most of the laser light to the communication detector 40, while a lesser amount is sent to the optical detector 38. As described below, tracking can be performed by circuitry associated with the optical detector 38 along a processing path A, while circuitry associated with the communication detector 40 can perform the various signal processing operations to retrieve the original binary pulse train 26 from the modulated laser light. In an embodiment, a finer level of tracking can be performed by circuitry along a processing path B, after the communication detector 40 and in addition to the tracking performed by circuitry along the processing path A.

Figure 3:
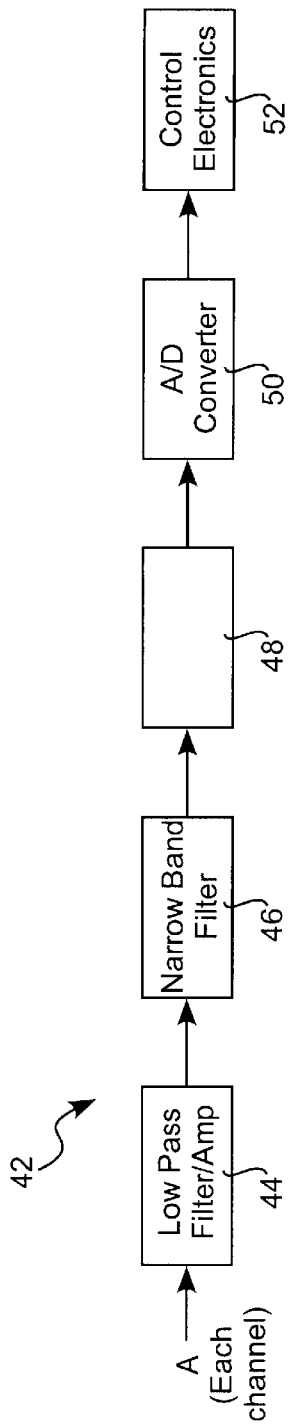
FIG. 3 is a block diagram of an embodiment of a signal processing circuit in an optical detector for the system of FIG. 2 that can process the tone signal.

FIG. 3 is a block diagram of an embodiment of a signal processing circuit 42 that can be coupled to the optical detector 38 to perform tracking-related processing along the processing path A. A separate processing circuit 42 can be coupled to each cell of the optical detector 38 in one embodiment to provide separate processing channels, while in another embodiment, some components of the processing circuit 42 can be shared by one or more cell(s) of the optical detector 38.

In operation, a cell of the optical detector 38 converts a received optical signal (e.g., the modulated laser light) into an electrical signal such as that represented by the signal diagram 10 of FIG. 1. This resulting electrical signal may then be demodulated by circuitry (not shown) to translate high frequency components of the modulated signal back to their original low frequency components (e.g., to translate the original tone signal 18 back to 1 kHz, as well as to translate the binary pulse train 26 from the high frequency carrier back to its baseband low frequencies). Then, the demodulated signal is fed into a low pass filter/amplifier 44.

The low pass filter/amplifier 44 amplifies the demodulated signal and filters out high frequency signals and noise above the frequency of the tone signal 18 in one embodiment. In another embodiment, the processing circuit 42 does not use/include the low pass filtering and/or amplifier 44.

Next, a narrow band filter 46, having a passband centered at the frequency of the tone signal 18, is used to retrieve the tone signal 18 while canceling out other frequencies. In another embodiment, the narrow band filter 46 alone may be used to recover the tone signal 18, without having to use the low pass filter/amplifier 44.

The retrieved tone signal 18 is then directed to a circuit unit 48. The circuit unit 48 can determine the strength (e.g., power, amplitude, etc.) of the tone signal 18. Thus, by knowing the relative strength of the modulated laser light (or more specifically, the relative strength of the tone signal(s) 18) that is incident on individual cells of the optical detector 38, the orientation of the receiver 24 with respect to the transmitted laser light and/or with respect to the transmitter 22 can be determined and adjusted if necessary.

To determine the strength of the tone signal 18 on each cell of the optical detector 38, the circuit unit 48 can comprise an absolute value circuit, square-law circuit, or other circuits to determine the amplitude or power of the tone signal 18.

In another embodiment, the circuit unit 48 can comprise a lock-in detection circuit. In operation, the lock-in detection circuit multiplies the sinusoidal tone signal 18 (which may have the form Acos ωt, where ω is the angular frequency) by another sinusoidal signal Bcos ω having the same frequency. Mathematically, the following equation can be derived if the two sinusoidal signals are in phase:

$$(A \cos \omega t)(B \cos \omega t) = AB - AB \sin^2 \omega t \quad (1).$$

If the two sinusoidal signals have a phase difference Φ, then the following equation can be derived:

$$[A \cos \omega t][B \cos(\omega t + \Phi)] = AB \cos \Phi - AB \cos \Phi \sin^2 \omega t - AB \sin \Phi \cos \omega t \sin \omega t \quad (2).$$

From Equations (1) and (2), it is noted that this multiplication of sinusoidal signals produces the DC terms AB and ABcos Φ, respectively. Thus, the multiplication, coupled with filtering to isolate the DC term, allows the lock-in detection circuit to obtain the DC term that is a representation of the amplitude of the tone signal 18. Once the strength of the tone signal 18 is obtained and compared for each cell in the optical detector 38, the alignment of the receiver 24 for tracking and reception purposes can be determined and adjusted.

The circuit 42 can include an analog-to-digital (A/D) converter 50 to convert the analog signal, representative of the amplitude of the tone signal 18, into a digital signal. The digital signal can then be processed by control electronics 52 to change the position of the receiver 24, if necessary, for optimal alignment.

Figure 4:
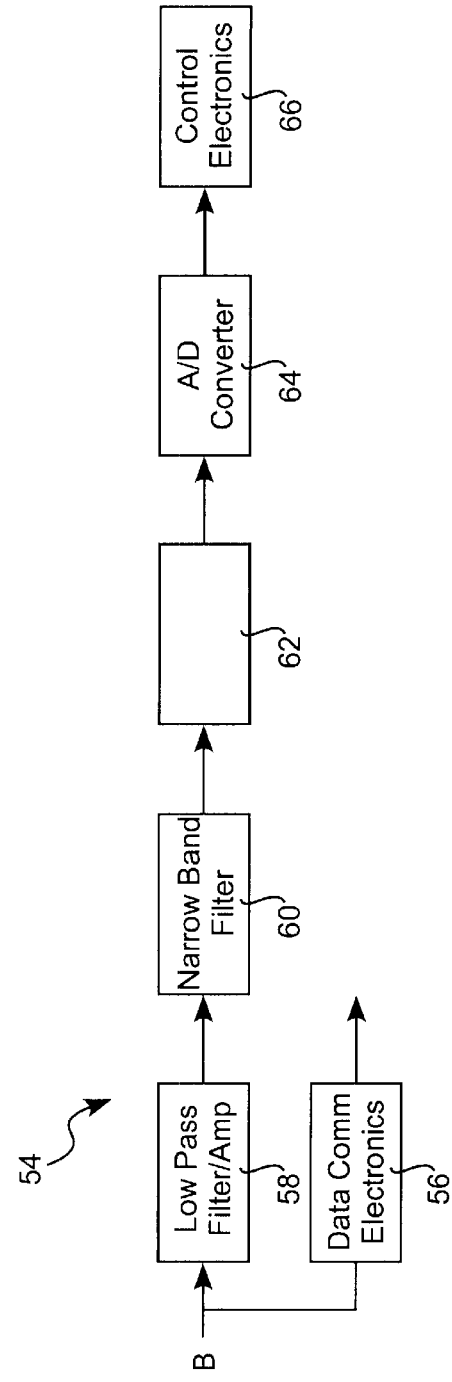
FIG. 4 is a block diagram of an embodiment of a signal processing circuit in a communication detector for the system of FIG. 2 that can process the tone signal.

FIG. 4 shows an embodiment of a signal processing circuit 54 that can be coupled to the communication detector 40 to perform a finer-level tracking-related processing along the processing path B that supplements the tracking-related processing along the processing path A described above. In another embodiment, tracking-related processing is performed only along the processing path A, without having to perform tracking-related processing along the processing path B.

The processing circuit 54 includes data communication electronics 56 or other circuitry to retrieve and/or process the data (e.g., the binary pulse train 26) from the modulated laser light. Similar to their corresponding components in the processing circuit 42 of FIG. 3, the processing circuit 54 of FIG. 4 includes a low pass filter/amplifier 58, narrow band filter 60, circuit unit 62, A/D converter 64, and control electronics 66. As with the circuit unit 48, the circuit unit 62 can use a lock-in detection circuit, or rectifiers, absolute value circuits, etc. to determine the amplitude or power of the tone signal 18. The A/D converter 64 converts an analog signal representative of this amplitude/power into a digital signal, and provides the digital signal to the control electronics 66. The control electronics 66 can be the same as the control electronics 52 of FIG. 3 in one embodiment, or they can be different circuitry in another embodiment.

In operation, the control electronics 52 of the circuit 42 can first trigger basic alignment adjustment of the receiver 24, based on the relative amplitude/power of the tone signal 18 detected at each cell of the optical detector 38. Next, the control electronics 66 of the circuit 54 can trigger finer alignment adjustment based on the strength of a single tone signal 18 received by the communication detector 40 and processed by the processing circuit 54. For example, the control electronics 66 can work in conjunction with hardware and software that correlates determined values for the power/amplitude of the tone signal 18 with values stored in a look-up table that represent incremental distances/ displacements of the receiver 24 for optimal alignment.

Figure 5:
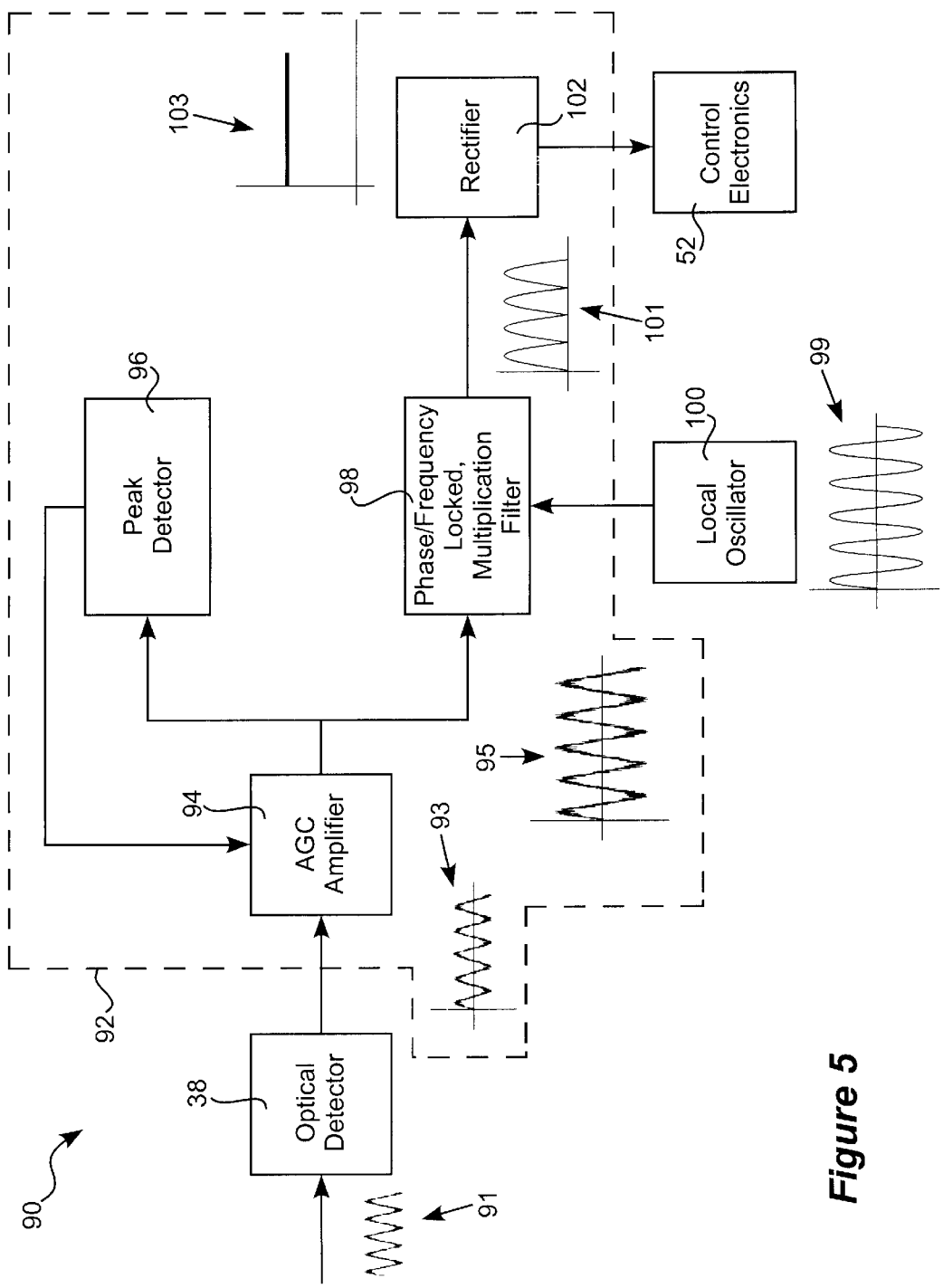
FIG. 5 is a block diagram of an embodiment of an adjustable gain control circuit that can be used to improve on the processing of the tone signal.

As described above, the optical detector 38 receives the modulated laser light with the tone signal 18 superimposed on it. The depth of the modulation may vary from one implementation to another, and in addition, the incoming signal power may vary over a large range depending on atmospheric attenuation and other impediments in a free space optical environment. FIG. 5 is a block diagram 90 showing an adjustable control gain (AGC) circuit 92 that addresses this problem. With the use of the AGC circuit 92, an optical receiver system can be provided with a wide dynamic range for situations when the tone signal 18 and/or the laser light is dramatically attenuated.

A separate AGC circuit 92 can be coupled downstream of each cell of the optical detector 38. In operation, each cell of the optical detector 38 detects/receives a tone signal 91, which may have noise and a DC component. The optical detector 38 converts the tone signal 91 from an optical signal to an electrical tone signal 93. The electrical tone signal 93 may include noise, may be amplified compared to the tone signal 91, and has the DC component removed. This electrical tone signal 93 is then fed into an AGC amplifier 94.

The AGC amplifier 94 amplifies the electrical tone signal 93 to obtain an amplified electrical tone signal 95, which may include noise. The AGC amplifier 94 outputs the amplified tone signal 95 to a peak detector 96. The peak detector 96 detects the amplitude of the amplified tone signal 95 and can trigger adjustment of the gain of the AGC amplifier 94 based on this detected amplitude. In one embodiment, the AGC amplifier 94 can be controlled by adjusting its gain to insure that its maximum output value is less that what it is capable of outputting. This insures that the receiver system is not losing signal information, even if the noise level is very high.

The AGC amplifier 94 also outputs the amplified tone signal 95 to a phase/frequency locked multiplication filter 98. The multiplication filter 98 takes the amplified tone signal 95 and multiplies it with a substantially clean, phase-locked sinusoidal signal 99 having the same frequency and generated by a local oscillator 100. As a result of the multiplication, noise is removed and a "clean" signal 101 is output from the multiplication filter 98. In one embodiment, the signal 101 can be an absolute value sinusoidal signal.

The signal 101 is fed into a circuit unit, such as a rectifier 102 or other similar circuit, to obtain a substantially DC signal 103 that has a signal level that represents the intensity of the received tone signal 91 at the optical detector 38. The level of the DC signal 103 is then used by the control electronics 52 to perform tracking control by comparing the levels of each DC signal 103 corresponding to each cell of the optical detector 38.

In another embodiment of the AGC circuit 92, the AGC amplifier 94 outputs the amplified tone signal 95 to a narrow bandpass filter (instead of outputting to the multiplication filter 98), with the bandpass filter having a passband centered on the frequency of the amplified tone signal 95. In this embodiment, the local oscillator 100 and the phase-locked sinusoidal signal 99 are not used. The bandpass filter filters the noise from the amplified tone signal 95 and outputs the signal 101, which in this case would be a standard sinusoidal signal (rather than an absolute value sinusoidal signal). The sinusoidal signal 101 is then fed into the rectifier 102 for further processing according to the manner described above.

In one embodiment, the local oscillator 100 can be common to each AGC circuit 92 that is correspondingly coupled to each cell of the optical detector 38. Furthermore in an embodiment, gain control circuitry (e.g., the peak detector 96 or other circuitry) can use information (such as the level of each DC signal 103) derived from each cell of the optical detector 38 to set the gain of each AGC amplifier 94, such that the gains are set to the level that produces a maximum signal level on the cell with the strongest received tone signal 91. It is noted that all of the AGC amplifiers 94 will have the same gain, in an embodiment, so that the different levels of the DC signals 103 derived from the output of each AGC amplifier 94 can be compared relative to each other.

In one embodiment, the AGC amplifier 94 is capable of amplifying the electrical tone signal 93 between 0 dB (×1) and +96 dB (×63000). Thus, the AGC amplifier 94 has a wide dynamic range for its gain. Without the AGC circuit 92, the receiver system may have a lesser dynamic range of approximately 46 dB (×200).

In conclusion, an embodiment of the invention advantageously modulates a carrier wave with both a data signal and a tracking signal. Because the modulation depth of the tracking signal is small in comparison to the peak-to-peak amplitude or power of the modulated/unmodulated carrier wave, data associated with the data signal is not lost or distorted. Furthermore, because the tracking signal (e.g., the tone signal 18) is carried on the same carrier wave as the data signal, a separate tracking signal on another carrier wave is not needed. The AC nature of the tracking signal provides advantages over other systems that are DC-based because it is largely unaffected by solar glint. Embodiments of processing circuits 42 and 54 described above provide excellent sensitivity performance while simultaneously minimizing the effects of noise.

The above description of illustrated embodiments of the invention, including what is described in the Abstract, is not intended to be exhaustive or to limit the invention to the precise forms disclosed. While specific embodiments of, and examples for, the invention are described herein for illustrative purposes, various equivalent modifications are possible within the scope of the invention, as those skilled in the relevant art will recognize.

These modifications can be made to the invention in light of the above detailed description. The terms used in the following claims should not be construed to limit the invention to the specific embodiments disclosed in the specification and the claims. Rather, the scope of the invention is to be determined entirely by the following claims, which are to be construed in accordance with established doctrines of claim interpretation.

What is claimed is:

1. A method, comprising:
   modulating a light signal with a data signal;
   modulating the light signal with a tracking signal having a modulation depth substantially smaller than a peak-to-peak amplitude of the light signal;
   transmitting and receiving the light signal modulated by the data signal and by the tracking signal;
   splitting the received light signal into first and second portions and directing the first portion to an optical detector and the second portion to a communication detector;
   recovering the tracking signal from the modulated light signal received at the optical detector and using the tracking signal to determine an orientation of a receiver component with respect to the received modulated light signal; and
   recovering the tracking signal from the modulated light signal received at the communication detector and triggering a tracking adjustment based on that recovered tracking signal, and in addition to, another tracking adjustment triggered by the tracking signal recovered from the optical detector.

2. The method of claim 1 wherein the tracking signal comprises a substantially sinusoidal signal having a frequency significantly lower than a frequency of the data signal.

3. The method of claim 1 wherein modulating the light signal with the tracking signal comprises providing the tracking signal with a modulation depth between 5% and 10% of the peak-to-peak amplitude of the light signal.

4. The method of claim 1 wherein recovering the tracking signal from the received light signal includes using a filter having a passband that includes a frequency of the tracking signal.

5. The method of claim 4, further comprising using a lock-in detection circuit to obtain a direct current value representative of an amplitude of the tracking signal.

6. The method of claim 4, further comprising using one of a rectifier circuit, absolute value circuit, or square law circuit to obtain a value representative of a strength of the tracking signal.

7. The method of claim 1, further comprising:
   converting the tracking signal from an optical signal to an electrical signal;
   directing the electrical signal to an amplifier circuit; and adjustably controlling a gain of the amplifier circuit to obtain a value representative of an amplitude of the electrical signal and using the value to adjust the orientation of the receiver component with respect to the received modulated-light signal.

8. The method of claim 1, further comprising recovering the data signal from the received modulated light signal.

9. An apparatus, comprising:
a receiver to receive a light signal modulated by a data signal and by a tracking signal;
an optical detector to provide an electrical signal representative of the received light signal;
a beamsplitter optically coupled to the receiver to split the received light signal into first and second portions and to direct the first portion to the optical detector and to direct the second portion to a communication detector;
a processing circuit coupled to the optical detector to recover the tracking signal from the electrical signal and to determine an orientation of a component of the receiver with respect to the received light signal based on the recovered tracking signal; and
another processing circuit coupled to the communication detector to recover the tracking signal and to trigger a tracking adjustment based on that recovered tracking signal, and in addition to, another tracking adjustment triggered by the processing circuit coupled to the optical detector.

10. The apparatus of claim 9 wherein the processing circuit includes a lock-in detection circuit to obtain a direct current value representative of an amplitude of the tracking signal.

11. The apparatus of claim 9 wherein the processing circuit includes one of a rectifier circuit, absolute value circuit, or square law circuit to obtain a value representative of a strength of the tracking signal.

12. The apparatus of claim 9 wherein the processing circuit further comprises a control circuit to adjust the orientation of the component of the receiver with respect to the received light signal based on the recovered tracking signal.

13. A system, comprising:
a transmitter unit having:
a driver unit to modulate a light signal with a data signal and with a tracking signal; and
a transmitter to transmit the light signal modulated by the data and tracking signals; and
a receiver unit having:
a receiver to receive the transmitted light signal modulated by the data signal and by the tracking signal;
an optical detector to provide an electrical signal representative of the received light signal;
a processing circuit coupled to the optical detector to recover the tracking signal from the electrical signal and to determine an orientation of a component of the receiver with respect to the received light signal based on the recovered tracking signal;
a beamsplitter optically coupled to the receiver to split the received light signal into first and second portions and to direct the first portion to the optical detector; and
another processing circuit coupled to a communication detector to recover the tracking signal from the second portion and to trigger a tracking adjustment based on that recovered tracking signal, and in addition to, another tracking adjustment triggered by the processing circuit coupled to the optical detector.

14. The system of claim 13 wherein the processing circuit includes a lock-in detection circuit to obtain a direct current value representative of an amplitude of the tracking signal.

15. An apparatus, comprising:
a transmitter unit to generate and transmit a first light signal modulated by a first data signal and by a first tracking signal;
a receiver unit to receive a second light signal modulated by a second data signal and by a second tracking signal, the receiver unit having a processing circuit coupled to an optical detector to recover the second tracking signal from the received second light signal and to determine an orientation of a component of the receiver unit with respect to the received second light signal, and a beamsplitter to split the received second light signal into first and second portions and to direct the first portion to the optical detector; and
another processing circuit coupled to a communication detector to recover the second tracking signal from the second portion and to trigger a tracking adjustment based on that recovered second tracking signal, and in addition to, another tracking adjustment triggered by the processing circuit coupled to the optical detector.

16. The apparatus of claim 15 wherein the processing circuit includes a lock-in detection circuit to obtain a direct current value representative of an amplitude of the second tracking signal.

17. The apparatus of claim 15 wherein the receiver unit includes an optical detector to convert the received second light signal to an electrical signal, the processing circuit including:
an adjustable gain amplifier to amplify the electrical signal;
a multiplication filter coupled to the amplifier to receive the amplified electrical signal and to multiply the amplified electrical signal with a local oscillator signal;
a circuit unit coupled to the multiplication filter to obtain a value representative of an amplitude of the multiplied signal from the multiplication filter; and
a control unit coupled to the amplifier to adjustably control a gain of the amplifier based on the value obtained by the circuit unit.

18. An apparatus, comprising:
a receiver to receive a light signal modulated by a data signal and by a tracking signal;
an optical detector to provide an electrical signal representative of the received light signal; and
a beamsplitter optically coupled to the receiver to split the received light signal into first and second portions and to direct the first portion to the optical detector and the second portion to a communication detector;
a first processing circuit coupled to the optical detector to recover the tracking signal from the electrical signal and to determine an orientation of a component of the receiver with respect to the received light signal based on the recovered tracking signal; and
a second processing circuit coupled to the communication detector to measure relative strength of the modulated light signal to trigger a tracking adjustment based on that relative strength, and in addition to, another tracking adjustment triggered by the processing circuit coupled to the optical detector.

19. The apparatus of claim 18 wherein the first and second processing circuits include a lock-in detection circuit to obtain a direct current value representative of an amplitude of the tracking signal.

20. The apparatus of claim 18 wherein the first and second processing circuits include one of a rectifier circuit, absolute value circuit, or square law circuit to obtain a value representative of a strength of the tracking signal.

21. The apparatus of claim 18 wherein the first and second processing circuits further comprise a control circuit to adjust the orientation of the component of the receiver with respect to the received light signal based on the recovered tracking signal.

22. A system, comprising:
a transmitter unit having:
a driver unit to modulate a light signal with a data signal and with a tracking signal, and
a transmitter to transmit the light signal modulated by the data and tracking signals; and
a receiver unit having:
a receiver to receive the transmitted light signal modulated by the data signal and by the tracking signal, and
an optical detector to provide an electrical signal representative of the received light signal; and
a beamsplitter optically coupled to the receiver to split the received light signal into first and second portions and to direct the first portion to the optical detector;
a first processing circuit coupled to the optical detector to recover the tracking signal from the electrical signal and to determine an orientation of a component of the receiver with respect to the received light signal based on the recovered tracking signal; and
a second processing circuit coupled to a communication detector to monitor and process the modulated light signal and to trigger a tracking adjustment based on the modulated light signal, and in addition to, another tracking adjustment triggered by the processing circuit coupled to the optical detector.

23. The system of claim 22 wherein the first and second processing circuits include a lock-in detection circuit to obtain a direct current value representative of an amplitude of the tracking signal.

24. An apparatus, comprising:
a transmitter unit to generate and transmit a first light signal modulated by a first data signal and by a first tracking signal;
a receiver unit to receive a second light signal modulated by a second data signal and by a second tracking signal, the receiver unit having a first processing circuit coupled to an optical detector to recover the second tracking signal from the received second light signal and to determine an orientation of a component of the receiver unit with respect to the received second light signal;
a beamsplitter to split the received second light signal into first and second portions and to direct the first portion to the optical detector; and
a second processing circuit coupled to a communication detector to monitor and process the modulated light signal and to trigger a tracking adjustment based on the modulated light signal, and in addition to, another tracking adjustment triggered by the processing circuit coupled to the optical detector.

25. The apparatus of claim 24 wherein the first and second processing circuits include a lock-in detection circuit to obtain a direct current value representative of an amplitude of the second tracking signal.

26. The apparatus of claim 24 wherein the receiver unit includes an optical detector to convert the received second light signal to an electrical signal, the processing circuit including:
an adjustable gain amplifier to amplify the electrical signal;
a multiplication filter coupled to the amplifier to receive the amplified electrical signal and to multiply the amplified electrical signal with a local oscillator signal;
a circuit unit coupled to the multiplication filter to obtain a value representative of an amplitude of the multiplied signal from the multiplication filter; and
a control unit coupled to the amplifier to adjustably control a gain of the amplifier based on the value obtained by the circuit unit.

27. A method, comprising:
modulating a light signal with a data signal;
modulating the light signal with a tracking signal having a modulation depth substantially smaller than a peak-to-peak amplitude of the light signal;
transmitting and receiving the light signal modulated by the data signal and by the tracking signal;
splitting the received light signal into first and second portions and directing the first portion to an optical detector and the second portion to a communication detector;
recovering the tracking signal from the modulated light signal received at the optical detector and using the tracking signal to determine an orientation of a receiver component with respect to the received modulated light signal; and
monitoring and processing the modulated light signal received at the communication detector and triggering a tracking adjustment based on the modulated light signal, and in addition to, another tracking adjustment triggered by the tracking signal recovered from the optical detector.

28. The method of claim 27 wherein the tracking signal comprises a substantially sinusoidal signal having a frequency significantly lower than a frequency of the data signal.

29. The method of claim 27 wherein modulating the light signal with the tracking signal comprises providing the tracking signal with a modulation depth between 5% and 10% of the peak-to-peak amplitude of the light signal.

30. The method of claim 27 wherein recovering the tracking signal from the received light signal includes using a filter having a passband that includes a frequency of the tracking signal.

31. The method of claim 30, further comprising using a lock-in detection circuit to obtain a direct current value representative of an amplitude of the tracking signal.

32. The method of claim 30, further comprising using one of a rectifier circuit, absolute value circuit, or square law circuit to obtain a value representative of a strength of the tracking signal.

33. The method of claim 27, further comprising:
converting the tracking signal from an optical signal to an electrical signal;
directing the electrical signal to an amplifier circuit; and
adjustably controlling a gain of the amplifier circuit to obtain a value representative of an amplitude of the electrical signal and using the value to adjust the orientation of the receiver component with respect to the received modulated light signal.

34. The method of claim 27, further comprising recovering the data signal from the received modulated light signal.

* * * * *